United States Patent

[11] 3,574,464

[72] Inventor Bradford Howland
 2161 Mass. Ave., Cambridge, Mass. 02140
[21] Appl. No. 745,162
[22] Filed July 16, 1968
[45] Patented Apr. 13, 1971
 Continuation-in-part of application Ser. No.
 454,602, May 10, 1965, now Patent No.
 3,486,325.

[54] CAMERA TEST EQUIPMENT AND METHOD
 9 Claims, 17 Drawing Figs.
[52] U.S. Cl. .................................................. 356/126
[51] Int. Cl. .................................................. G01b 9/00
[50] Field of Search ........................................ 356/124–
 —127

[56] References Cited
 UNITED STATES PATENTS
 3,100,239  8/1963  Courtney-Pratt............. 356/124

Primary Examiner—Ronald L. Wibert
Assistant Examiner—Conrad Clark
Attorney—Jack Larsen ABSTRACT: Two methods are described for testing cameras and camera lenses by utilizing the properties of the crossed-cylinder lens, an ophthalmic test device. In the first, the cylinder lens is used in conjunction with a rectangular grid to defocus the star image formed by a collimator. This test permits quantitative determination of axial chromatic aberration, spherical aberration and its variations with wavelength, and coma of the lens. In the second, a segment of the cylinder lens is used as a supplementary lens attachment to the camera, which photographs a polar-coordinate chart. Analysis of the photograph permits determination of the sagittal and tangential field curvatures and also indicates errors in focal adjustment and misalignment of film plane with respect to the lens axis.

These tests require cylinder lenses of smaller dioptric power and quality superior to that available from the ophthalmic lens industry. Methods for the construction and synthesis of the needed large-aperture weak, cross-cylinder lenses and segments are given.

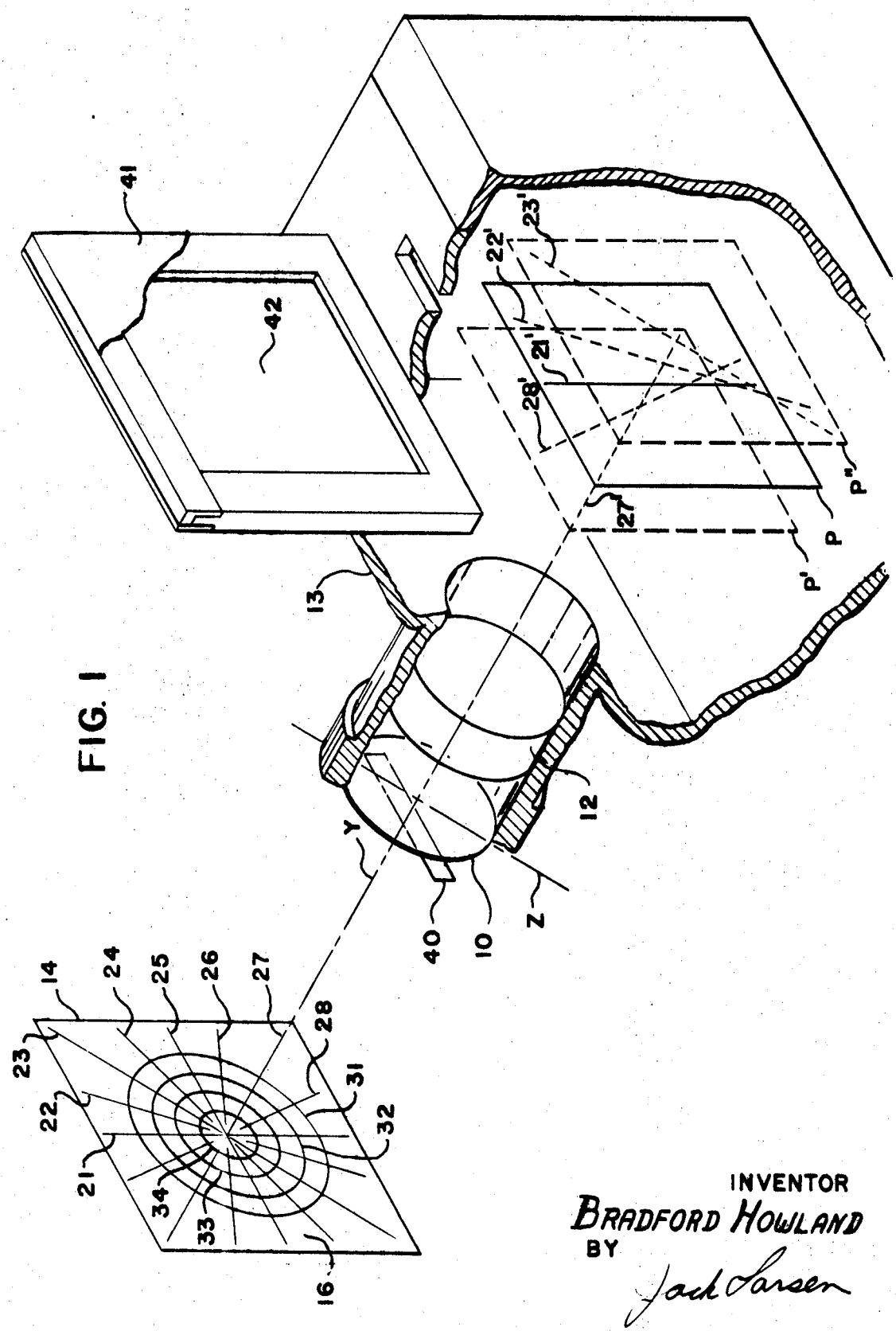

INVENTOR
BRADFORD HOWLAND
BY
ATTORNEY

INVENTOR
*Bradford Howland*
BY
*Jack Larsen*
ATTORNEY

CAMERA TEST EQUIPMENT AND METHOD

This application is a continuation-in-part of my copending application, Ser. No. 454,602, filed May 10, 1965 and now U.S. Pat. No. 3,486,325 for Optical Test Equipment and Methods for making and using same.

This invention relates to photography. More particularly it relates to a simple test whereby a photographer may check on the focus and quality of his camera and to auxiliary equipment for the test.

In recent years spectacular improvements have been made in the performance of wide-aperture photographic objectives; so that often the quality of a photograph is governed more by the focusing capabilities of the associated camera mechanism than by the inherent resolution limits of the lens. Commonly used focusing means have shortcomings. The attenuated image on the ground glass of the reflex camera is poorly suited for rapid and accurate focusing in dim light situations; while with a range finder camera, there is the possibility of mechanical inaccuracy in the mechanism.

An object of this invention is to provide methods of testing a camera system which enables a photographer to achieve more accurate focal settings than can be achieved by the trial-and-error methods of the prior art. Another object of the invention is to provide simple and inexpensive auxiliary lenses and test charts, patterns, and apparatus for use in the method.

A feature of the invention is the employment of an auxiliary crossed-cylinder slit lens. Another feature of the invention is the making of photographs of a special test pattern through the auxiliary lens. A feature of a method of the invention is the use of a grid of fine wires in conjunction with a point source and a collimator with a crossed-cylinder lens. A feature of a method of the invention is the use of but a segment of a crossed-cylinder lens as the auxiliary lens.

Other features and objectives of the invention will be apprehended from the following specification and annexed drawings of which:

FIG. 1 is a schematic representation of the arrangement for the test;

FIGS. 2a, 2b, and 2c illustrate the appearance of test photographs of the chart of FIG. 1 showing differences in focus;

Figure 2A:

This invention makes use of the crossed-cylinder lens, of importance in opthalmic diagnosis. The term "crossed-cylinder lens" as used herein designates a sphero-cylinder lens having equal positive and negative refractive powers about two perpendicular axes. When such a lens is placed in front of a perfect photographic objective lens the combination exhibits a strong astigmatism. FIG. 1 represents the combination of the crossed-cylinder lens 10 in front of the normal objective 12 of a camera 13, viewing a test card 14 having a pattern 16. In the absence of the crossed-cylinder lens 10 the image of the test pattern 16 would be formed at the focal plane P of the objective 12. As arranged, the analyzer lens 10 has its axis of positive correction Y and its axis of negative correction Z each inclined at 45° to the horizontal. Test pattern 16 comprises a number of radial straight lines (for purposes of illustration in this FIG., eight in number evenly spaced) and numbered 21 through 28 respectively, and concentric circles (in this case four of them equally spaced) numbered 31 through 34 respectively. The target line 27 is parallel to the lens axis Y. The target line 23 is parallel to the lens axis Z. With the arrangement as shown, without the slit to be described below, the placing of the auxiliary lens 10 in front of the objective 12 would completely blur the image in the normal image plane P. However, lines in the test pattern 16 which are parallel to the Y-axis of the lens 10, that is the line 27 and segments of the circles 31, 32, 33 and 34 at their intersections with the line 23 would be imaged in the plane P' lying in front of the normal focal plane P by an amount determined by the positive correction of the crossed-cylinder lens. Similarly the line 23 and the segments of the circles at their intersections with the line 27 are imaged in the plane P'' lying behind the normal focal plane by an amount determined by the strength of the negative correction of the auxiliary lens 10 about the negative correction axis Z. This property of the whole crossed-cylinder lens lends it to its use in optometry.

This embodiment departs from the prior practice by blocking off almost the whole of the crossed-cylinder lens leaving only a slit along an axis midway between the Y- and Z-axes. The slit 40 in FIG. 1 is shown horizontal. With the slit aperture in place, the available light is greatly reduced. The image in the image plane may not be observable by means of a ground glass; but film 40 in a plate holder 41 may be positioned at the image plane P; and it merely requires increased exposure time for a photograph in the customary manner. Since only light passing through the underlying small fraction of the whole surface of the crossed-cylinder lens is used in the present method it is not necessary to have a complete lens but only a sliver, as will be explained below. With the slit in place the line 27 is imaged in the plane P'; and the line 23 is imaged in the plane P'', as explained above; but, in addition, the line 21' appears as the image of the line 21 in the plane P. Intermediate between the planes P and P'' is formed an image 22' of the line 22, and intermediate between plane P and the plane P' is to be found the image 28' of the line 28. To avoid undue complication of FIG. 1 the radial lines in the test pattern are illustrated spaced 22½° apart. In practice, it is preferred to use many more lines, for example 36 lines spaced but 5° apart.

Figure 2B:
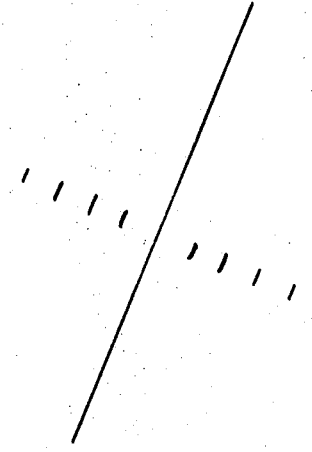
Figure 2C:
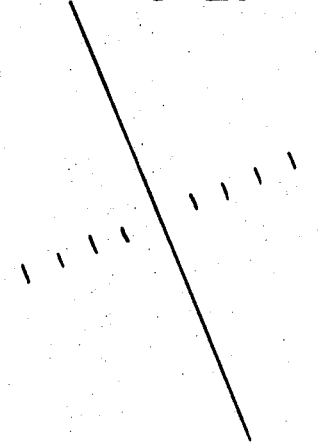

It will be apparent that taking a single photograph of a test pattern through the special analyzer lens as just described is a simple and powerful means to check the accuracy of a camera range finder setting. With the camera diaphragm (not shown) stopped wide open and the focus determined by the range finder, a photograph is taken. Upon development, the picture shows the error in setting. FIGS. 2a, 2b and 2c are illustrative of such photographs taken respectively at the exact focal distance and at either side of it. By this means for each setting of the range calibration of the camera a single photograph is all that is necessary to determine the error in the setting.

Figure 3A:
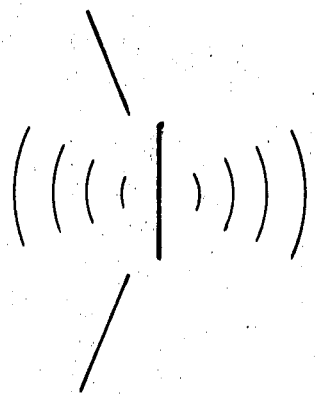
FIGS. 3a and 3b show results of misalignment.
Figure 3B:
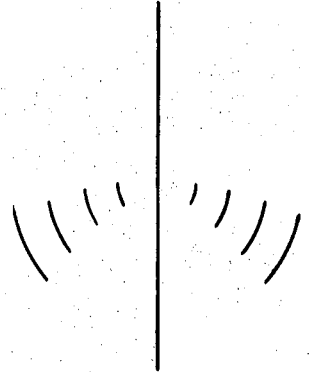
Figure 4A:
FIGS. 4a, 4b and 4c show lens imperfections.
Figure 4B:
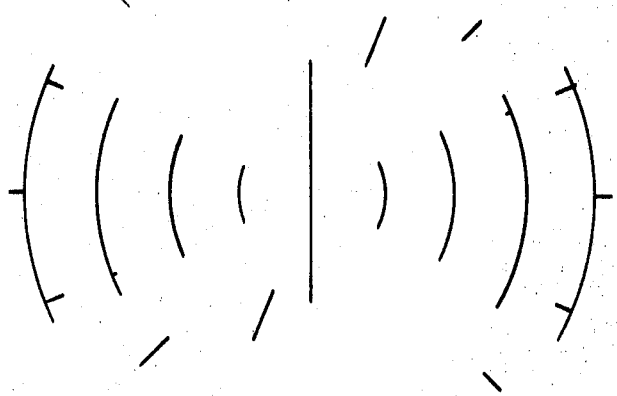

In addition to providing the careful photographer with this powerful tool with which to maintain the calibration of his cameras, the method can be used to check a camera for other defects in mechanism and lens. For example, FIG. 3a is representative of a test pattern indicating a 5° vertical misalignment between the axis of the lens and the normal to the film plane. FIG. 3b represents the same degree of horizontal misalignment of the axis of the lens with respect to the film plane. FIG. 4a is a test photograph indicating pronounced curvature of field. FIG. 4b illustrates the effect of strong curvature of the radial field only.

Figure 4C:
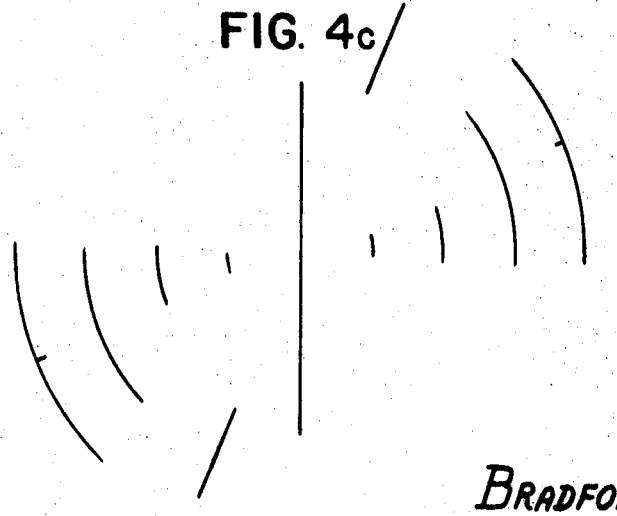

FIG. 4c represents a test photograph demonstrating astigmatism. In this pattern the radial and tangential elements of the image form tracks curved in opposite directions.

Other lens defects such as coma and spherical aberration may be detected by the method as well as the various combinations of these defects. The appearance of the resulting test photograph in each case will depend upon the relative strength of the defect in comparison with the strength of the auxiliary lens.

The more nearly perfect the lens under test, the weaker a crossed-cylinder lens required to test it. For modern camera lenses, corrections in the crossed-cylinder lens of the order plus or minus one-eighth diopter or less are required. The production of such weak analyzer lenses by the established practices in the art has been found often to result in lenses having perceptible defects.

The traditional method of making a crossed-cylinder lens is to grind one surface with a given convex cylindrical correction, say 1 diopter, and to grind the opposite surface with a concave spherical correction of one-half the strength, for this example one-half diopter. The result is a crossed-cylinder lens of ±½-diopter strength.

An improved crossed-cylinder weak lens may be obtained by grinding a lens as just described having substantial corrections of about ±1 diopter, then embedding the lens in a clear plastic having an appropriate index of refraction whereby both the corrections and any defects are proportionately reduced.

A preferable method for making the analyzer lenses for the invention depends on the fact that only a narrow strip of lens is used, the slit lies along the section of uniform thickness bisecting the axes of maximum positive and negative curvature. This portion of the surface has the helicoidal shape of a twisted sheet.

Figure 5:
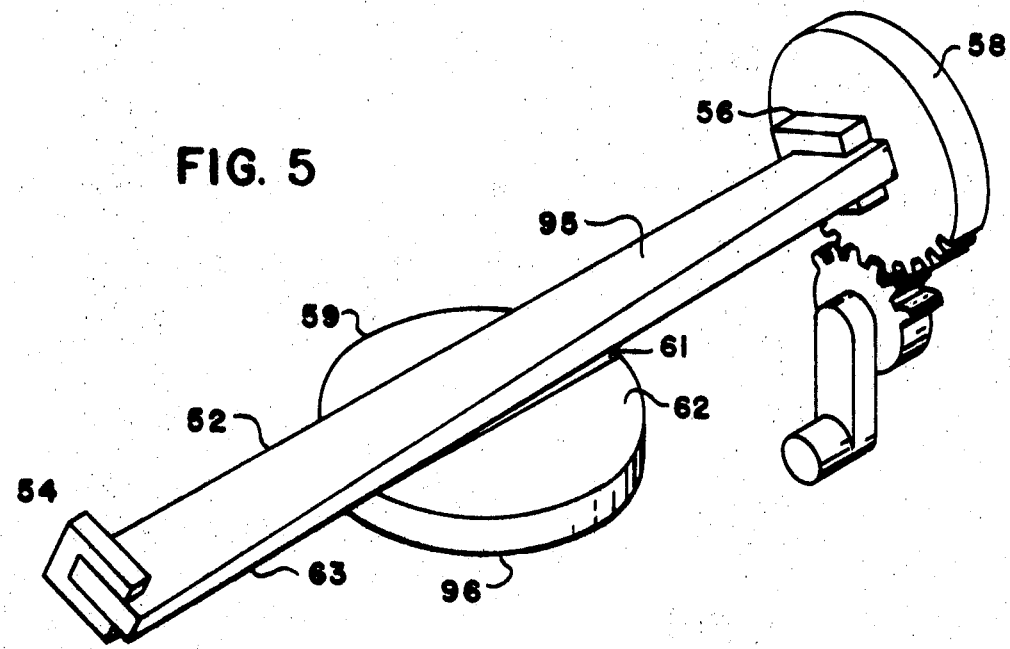
FIG. 5 illustrates an improved method of manufacturing a weak crossed-cylinder slit lens.

It is, therefore, possible to form the desired lens without grinding, by twisting a rectangular rod of optical glass. FIG. 5*

Figure 6:
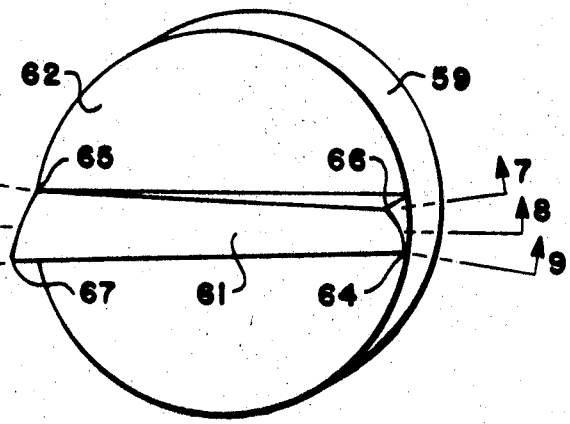
FIG. 6 is detail of FIG. 5 drawn to exaggerated scale.
Figure 7:
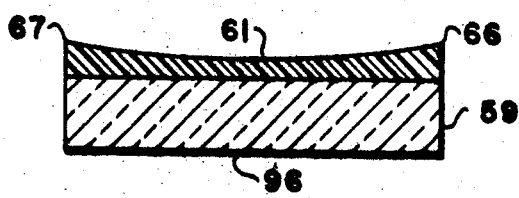
FIGS. 7, 8 and 9 are sections taken through the article of FIG. 6.
Figure 8:
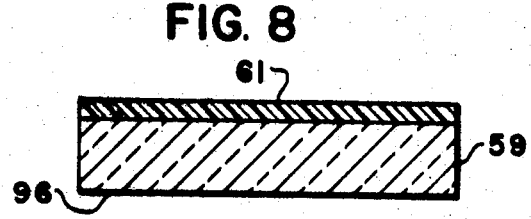
Figure 9:
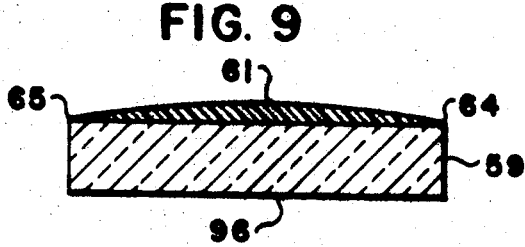

* Note: FIGS. 5, 6, 7, 8, and 9 are copies of FIGS. in the above-noted copending application. shows the method of fabricating the lens. A rod 52 of optical glass ground flat and square is held at one end by clamping means 54. At the other end it is retained by a clamp 56 which is twisted by a mechanism 58. To provide a substrate, against the twisted rod 52 is placed an optically clear and flat disc 59. Between the twisted rod and the flat disc is formed an irregular volume 61 bounded on the one side by the flat surface 62 of a disc and on the other side by the twisted lower surface 63 of the rod. This space 61 is filled with a suitable clear homogeneously refractive plastic material. This plastic becomes the correcting lens of the desired shape. As is shown in FIG. 6, in which the plastic is drawn to exaggerated scale with the rod stripped away, stripped plastic element has minimum thickness at the points 64 and 65 where the rod 52 is in contact with the disc 59. Maximum thickness is at the points 66 and 67. FIG. 7 is a section through the FIG. 6 taken in the plane 7-7. FIG. 8 is the section of uniform thickness taken through the plane 8-8 and FIG. 9 is a section through plane 9-9. The final lens can be made from the twisted lens assembly of FIG. 5 by a number of variations depending upon economic factors. In one variation, the plastic used between rod and the disc is an adherent clear epoxy resin which has sufficient binding strength that upon release of the clamps the rod 52 is retained in its twisted position and the combination of rod, plastic, and disc becomes the slit lens, with all but a slit along the centerline of the twisted surface being rendered opaque. As a second alternative, the glass bar may be treated with a release agent; and when the plastic body 61 is set, the glass bar 52 is stripped off, leaving the desired lens shape. By a third method the rod 52 is firmly cemented to the disc 59 in twisted form. Then, removed from the clamps, the cemented combination of rod 52, cement, and blank 59 is ground and polished, the top surface 95 of the rod being ground flat and parallel to the bottom surface 96 of the blank 59. At the completion of the grinding operation, the rod 52 is stripped from the blank and its stress is thereby relieved. The lower surface 63 of the rod is restored to flatness; but the top surface 95 permanently acquires the desired twisted helicoidal shape.

The theoretical purist will immediately recognize from the boundary conditions that the volume between a helicoid and a plane cannot be the exact optical equivalent of the volume between a sphere and a cylinder, or between two cylinders. Extended far enough, the twisted bar turns full circle. Its description, therefore, requires periodic functions such as the Fourier Series. In contrast, the sphere and the cylinder are much simpler surfaces. Notwithstanding this fundamental difference, it has been found that for slightly twisted bars, and when using only the portion along the section of uniform thickness, the higher order mathematical terms may be neglected. The freedom of the novel lens from artifacts and other surface irregularities more than makes up for any lack of mathematical purity.

The torsion of a rectangular beam is mathematically manageable. The theory is developed in I.S. Sokolikoff "Mathematical Theory of Elasticity," McGraw-Hill Book Co., 1946, pp. 143—149 and in other standard treatises on the subject.

It will also be clear that the basic functioning of the test is not changed by the interposition of a thin spherical lens in the nature of a portrait attachment between the camera and the target. Accordingly, a planocylindrical lens may be used as an analyzer with the slit skewed at 45° to the cylinder axis. This expedient introduces a bias in the range calibration which, however, can be accommodated. In such a case the slit does not lie along a section of uniform thickness; but it does lie in the axis which bisects the directions of principal curvature of the surface, as in the other examples.

Figure 10:
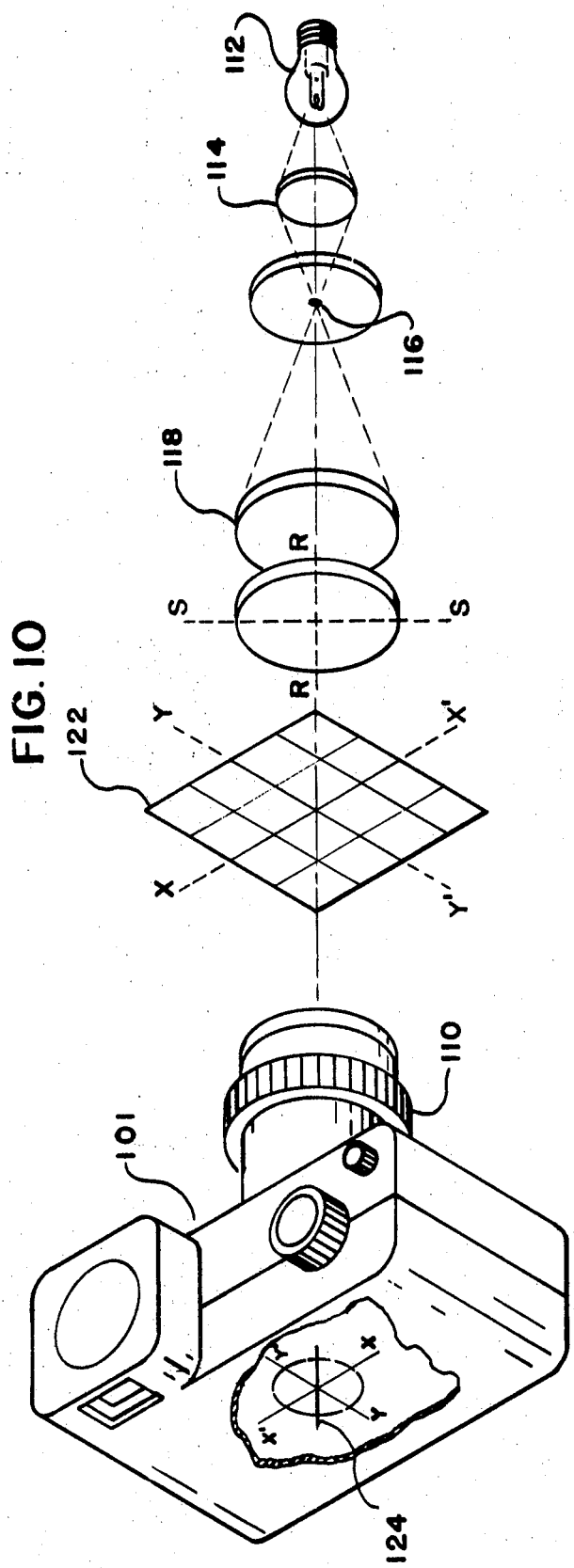
FIG. 10 is a partially schematic representation of alternative apparatus for practicing the invention.
Figure 12:
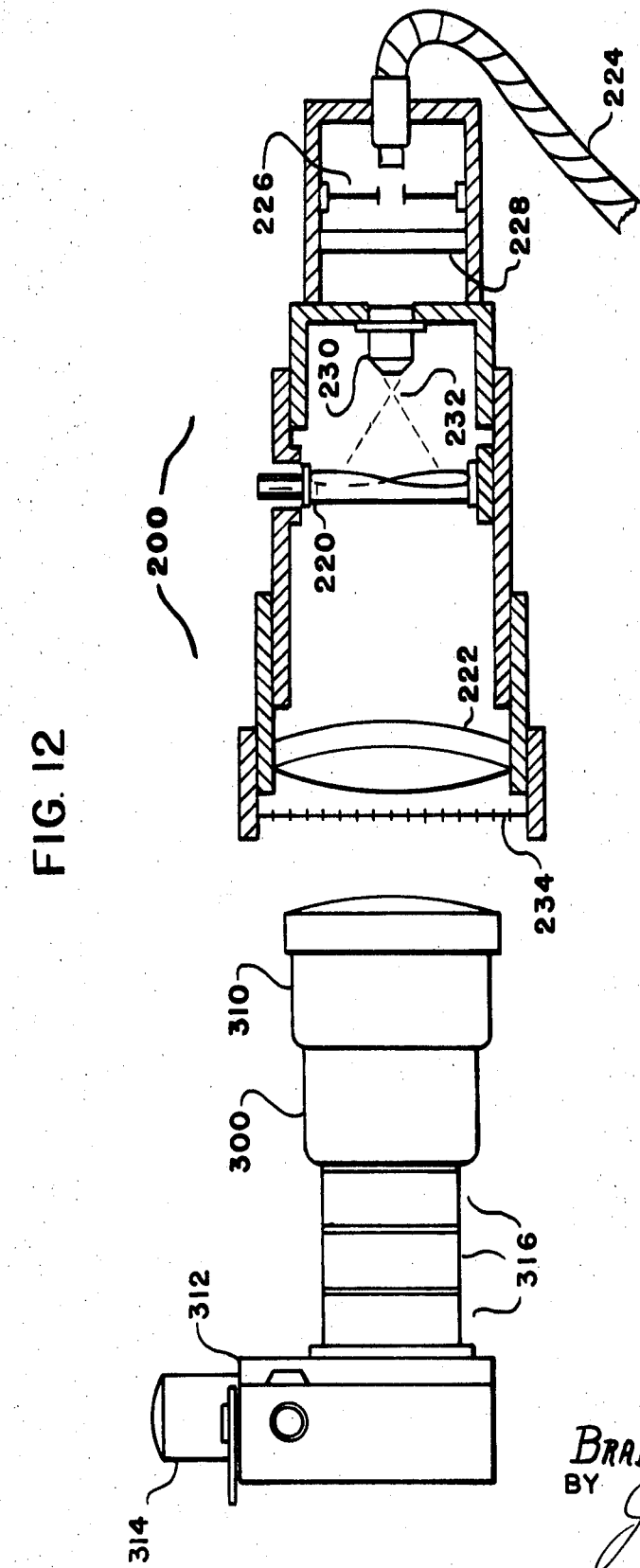
FIG. 12 is a schematic representation of an optical system which provides the equivalent of a variable weak cylinder lens as applied to the invention.

A modification of the test method is shown in FIG. 10. In this modification, not one slit; but in effect a family of slits are used, and all parts of the lens are tested. According to the previously-described tests, a chip in a lens would be ignored unless it is in line with the slit. In the arrangement of FIG. 12 the whole of the lens is surveyed. Instead of photographing a chart with the crossed-cylinder slit, the camera 101 and lens 110 under test are focused at infinity and receive a beam of light from a source 112 which is condensed by a lens 114 on a small circular aperture 116 and collimated by a lens 118 to present a plane wave front to the crossed-cylinder lens 120 which warps the advancing plane wave front into a saddle surface, bending it forward about the axis RR of positive cylinder correction and bending it backward about the axis SS of negative cylinder correction. It is preferred that the axes RR and SS be oriented at 45° to the horizontal and that the axes YY' and XX' of the grid 122 be vertical and horizontal, respectively. The grid by its shadow breaks the beam of light into a bundle of pencils of light and allows, in effect individual rays to be traced.

If one were to interpose a ground glass screen to intercept the beam as it converges behind the lens 110 the square grid pattern bounded by a circular lens aperture as viewed immediately behind the lens would be observed to transform progressively into an elliptical spot and the grid squares into ever smaller rhombuses, the whole spot coalescing into a blurred bright line 124 parallel to the positive cylinder axis RR. At this line the rays originating on one side of the plane of the axis RR and the line 124 cross over to the other side of the plane as the bright line changes to an ellipse, broadening as it shortens, becoming a tiny circular spot 126 at the normal image plane.

Since the cross-cylinder lens 120 has equal and opposite extrema of curvature, the line foci lie at approximately equal distances from the focal plane, and the image determined by the intersection of the focal plane and the astigmatic bundle at its midpoint is circular in outline. This blur image 124 is a congruent image of the grid as seen through the lens aperture, reflected about the axis RR. The effect is to interchange the axes of the coordinates of the grid in the shadow image, vis-à-vis the coordinates of the grid, as indicated in FIG. 10.

Figure 11:
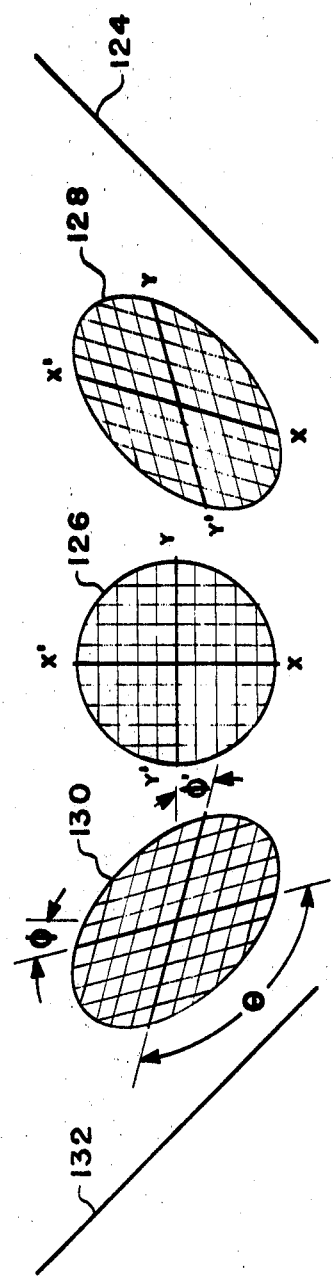
FIG. 11 is a representation of a family of test photographs made by the apparatus of FIG. 10 at the two astigmatic foci and at intermediate positions.

With the displacement of the film plane toward one of the astigmatic foci, the blur image sustains an elliptical distortion along the diagonal, ultimately collapsing into the astigmatic line image, in which case the film plane displacement, Δ, is given by $$\Delta = F^2 C, \quad (1)$$

where $F$ is the focal length of the camera lens, and $C$ is the dioptric power corresponding to the extreme values of curvature of the cross-cylinder lens. FIG. 11 shows a series of such images, spanning the focal interval bounded by the astigmatic foci. It will be understood that the line 124, shown black, is actually a 45° bright line in a dark field. Between the first astigmatic focus and the focal plane, the blur spot broadens into an ellipse 128 in a dark field with the grid shadow forming rhombic cells leaning to the right. As mentioned the blur spot becomes a circle 126 at the focus with square cells, while behind the focus, the image is of an ellipse 130 with rhombuses leaning to the left. At the second astigmatic focus the image is of a line 132 at 45° from the vertical parallel to the negative cylinder axis SS. Beyond the second focus, the pattern becomes more blurred, larger, and more circular and is not of interest.

The rhombic or parallelogram distortion of the pattern of the shadow image of the grid provides a sensitive indication of the focal shift. The relation between the focal shift, δ, and the angular orientations, and ', of the images of the vertical and horizontal elements of the grid is $$\delta = F^2 C \tan \quad (2)$$

$$\delta = F^2 C \cot '. \quad (3)$$

From a photographic enlargement of the blur image, the angle, Θ, between these elements in the image of the grid, can be measured more directly, where $$\theta = 2\phi + \frac{\pi}{2} \quad (4)$$

The sensitivity with which the method permits us to determine the focal shift is seen to be inversely proportional to $C$; hence, the importance of weak cylinder lenses for these tests.

A grid composed of fine occluding wires on a clear background is preferred rather than its conjugate, an orthogonal array of narrow, equally spaced slits. Both arrangements generate multiple images of the point source. From Babinet's principle, it is known that each of these conjugate arrays has equal energy in the diffraction image. The grid, however, causes proportionally less energy to be diverted into the diffraction image.

The linear distance $\tau$ measured at the film plane, which characterizes the extent of the diffraction blur caused by an element of the grid, is given by $$\tau \approx F\frac{\lambda}{D} \quad (5)$$

where $\lambda$ is the wavelength, $F$ is the focal length, and $D$ is the width of the element of the grid. The ultimate resolution of a lens is given by a similar formula, $$n = 1.22 F\frac{\lambda}{A} \quad (6)$$

where $A$ is the aperture of the lens. These considerations show the difficulty with most lens tests that make use of aperture screens: if the test is to be a sensitive one, $D$ must be comparable in size with $A$, in order that diffraction not blur the image of the grid by an amount in excess of the size of the defect in imagery that we wish to detect; on the other hand, we clearly require that $D$ be much less than $A$ if the grid is to demarcate with precision the zones of the lens.

For these reasons, it is most fortunate that, in the present instance, the effect of the apparent rotation of axes of the shadow image is to cause the diffraction blur at the grid to smear the images of the elements of the grid along the direction of the line elements of the grid. The shadow image of a properly oriented rectangular grid thus suffers negligible diffraction blurring provided that the focal adjustment is such as to render the blur image rectangular; in the limiting case the sharpness of the shadow image of the grid is determined by diffraction at the lens aperture.

AXIAL CHROMATIC ABERRATION

Where the lens suffers from axial chromatic aberration, i.e., primary or secondary spectrum, there is parallelogram distortion of the shadow image of the grid at certain wavelengths. Exposures made through successive interference filters of a set suffice to define the defect.

SPHERICAL ABERRATION

Where the lens suffers from spherical aberration, the effect is more complex. Consider the behavior of rays intersecting the aperture of the lens along a diameter at various heights above the axis. The effect of spherical aberration is to shift the points of intersection of some of these rays in the image plane toward or away from the axis; the amount of this shift is termed the "lateral" or "transverse spherical aberration." To determine the effect of this shift on the pattern of the shadow image of the grid, it is necessary to consider the differing orientation of the image of the diametral line in the shadow image. The effect of the interchange of axes in the shadow image is this: the shadow image of the diametral elements of the grid becomes a direct Cartesian plot of the transverse spherical aberration along the diameter! This curve is a cubic curve for simple, third-order spherical aberration.

This test procedure is similar to, and, in fact, represents a variant instrumental realization of the Optical T-Bench method of Washer, J. Res. National Bureau of Standards 61, 31—39, Jul. 1958. Both methods provide direct measurement of the transverse spherical aberration, and indirect measurement of the axial spherical aberration.

TEST FOR COMA

The effect of coma on the performance of a lens has been discussed by Brouwer, who also calculated the equations for the shadow images of wires occluding the aperture of a lens suffering from this and other defects, Matrix Methods in Optical Instrument Design (W.A. Benjamin, Inc., N.Y., 1904, p.107) The camera is assumed to image a point source, the image is displaced along the x-axis of the film plane, the cylinder lens is assumed to be weak, and the effects of interchange of the axes of the shadow image have been taken into account. Under these conditions, it is determined that a point with coordinates $(x_o, y_o)$ in the plane of the lens aperture is remapped as a point $(x_1, y_1)$ in the film plane:

$$x_1 = mx_o + ak(3y_o + x_o^2) \quad (7)$$

$$y_1 = my_o + a2kx_o y, \quad (8)$$

where $m$ is a constant proportional to the strength of the cylinder lens, and $k$ is the product of the image displacement and the coma of the lens.

DEFECTS OF FIGURING

Since the foregoing method tests the entire aperture of the lens, defects of figuring that cannot be easily described in terms of the simple aberration coefficients are still detectable and their effects can be quantitatively assessed, by the displacements of the elements of the grid pattern.

APPARATUS AND TESTS

Commercially available ophthalmic cylinder lenses, both uncut 58-mm. blanks, and 37-mm. diagnostic test lenses, may be used. The smallest available power of ophthalmic crosscylinder lens has the prescription (−0.12D, +0.25D); the first number is the spherical power, and the second is the cylinder power, both measured in diopters. The magnitude of the spherical power characterizes the strength of the cross-cylinder lenses, since it corresponds to the extrema of curvatures, and equals the value of $C$ in equations 1—3.

The method has been used to study a refracting telephoto lens of 250-mm. focal length, and a catadioptric telephoto lens of 500-mm. focal length. Since experience has shown that the strength of the cross-cylinder lens should be between one-fortieth and one-hundredth of the power of the lens that is being tested, the cross-cylinder lens is of 70-mm. aperture and strength $C$=0.05 diopters, approximately.

The specifications governing the quality of ophthalmic lenses are chosen to insure excellence of refraction of the human eye, with a lens limited in aperture to 8 mm., and resolution to 1 minute of arc. It is therefore not surprising that commercially available ophthalmic lenses of powers less than 0.25 diopter were generally adequate in quality of figuring for tests of modern, long focal length camera lenses.

Two solutions to the large-aperture, weak, cross-cylinder lens problem are: (a) the extension to large plates of the twisting methods of FIGS. 5—9 for construction of such lenses; and (b) as shown in FIG. 12 a variable astigmator 200 in which, by means of a single strong cylinder lens, a wide range of powers of cross-cylinder lenses is provided. The method depends on the weakening effect, caused by placement of the cylinder lens 220 only a fraction of the distance from the virtual sources of light, to the collimator lens 222. Three design parameters are of importance here: (i) the collimator lens should have a resolution capability in excess of that of the lens under test, (ii) to minimize its contribution to axial chromatism, the focal length of the collimator lens should be at least five times that of the lens under test (we have been unable to meet this requirement), (iii) to minimize chromatic error, the cylinder lens should either be an achromat, or a minus cylinder lens.

The cylinder lens preferred is a −5-diopter lens, the strongest such lens from a set of ophthalmic test lenses.

Instead of the simple aperture of FIG. 10, a more complex point source is preferred. Light from a suitable lamp is conveyed by a flexible fibre-optic light pipe 224 which terminates at an iris diaphragm 226, typically ½ to 4 mm. in diameter and large enough to be perfectly round. Light from this spot passes through a color filter 228, as desired and is collected by a microscope lens 230 producing a reduced image of the iris at a virtual point source at 232. From 232 spherical waves extend to pass through the cylinder lens 220. (This lens causes the blur spot to appear as an ellipse.) The spacing between the cylinder lens 220 and the source 232 is made adjustable so that the radius of curvature of the spherical wave fronts that undergo warping by the cylinder lens is variable. The warped wave fronts proceed to the collimating lens 222 at a distance from the cylinder lens adjusted to flatten out the wave fronts into a more or less plane wave, warped backward around the negative cylinder lens axis and forward about the axis of zero cylinder correction. In collimating the beam, all front curvatures are reduced proportionately, therefore when the cylinder lens is positioned close to the source 232, the resulting astigmatism is less than when the cylinder is spaced farther from the source 232. Using a collimating lens 222 of 106.9 cm. focal length with the 5-diopter cylinder lens, with the cylinder-collimator spacing adjustable from 70 to 95 cm. and cylinder-to-source spacing adjustable 15 to 35 cm., equivalent cylinder powers ranging from $C=0.0$ diopters up to $C=0.1$ diopters, approximately, are attainable.

A choice of interchangeable photoetched beryllium-copper screens of approximately 3-mm. and 5-mm. mesh was provided for the screen 234, the line-to-space ratio in each case was 1:12. The angular orientation of the screen 234 is critically adjustable relative to the axes of the cylinder lens, and approximately horizontal. A conventional arrangement of microscope objective, interference filters of 100 A. bandwidth, and aperture controlling the spot size was employed. (Note: The spot size is a critical factor determining the sharpness of the shadow image. The cylinder lens causes this spot to appear as an ellipse.) The astigmator 200 and a camera 300 to be tested are mounted on separate, heavy, adjustable tripod assemblies (not shown) and no difficulty in relative alignment has been experienced.

As is now well known, a laser provides isophase wave fronts of great purity and smoothness. Where greater precision is required to produce bundles with small and precisely determined amounts of cross-cylinder astigmatism, a laser would be used in conjunction with first-surface reflecting optics to provide an equivalent variable astigmator.

For the above-mentioned telephoto lenses, the test procedure is as follows: The separations of the elements of the variable astigmator are adjusted for an equivalent cylinder lens power of $C=0.05$ diopter, with the focal adjustment of the astigmator such that the camera lens is near its infinity stop. The image of the grid is viewed through the lens 310 of the camera 300, which is assumed to be equipped with a reflex focusing screen. Next, the fine focus adjustment of the camera, and the angular orientation of the aperture screen 234 are iteratively adjusted for the sharpest image of the grid pattern. The collimator spot size is then diminished until further sharpness increase in the shadow image is not perceived, and time exposures with various interference filters are taken.

The loss of light and superimposed granularity of a ground glass screen are excessive, when photographing an image that is approximately a millimeter in size. For viewing and focusing, it is preferred to use instead a separate 35-mm. reflex camera body 312 (such as NiKon-F), equipped with a clear glass calibrated reticle, and an improved waist-level magnifier 314 of triplet construction. This camera body is coupled to three, two-times-enlarging image-amplifier units 316 (known to the photographic trade as "TeleXtender" units.) This assembly functions as a microscope, permitting one to view the image at the focal plane with magnification sufficient to insure accurate focal adjustment.

The photograph is taken by attaching a second camera body (not shown, which is attached without extensions) using Kodak High Contrast Copy film, which produces negatives of normal contrast and exceptional resolution when developed in a phenidone-base developer, termed POTA by its originator.

In a test of an excellent 250-mm. f/4 telephoto lens, the equivalent power of the cross-cylinder lens was determined to be $C=0.05$ diopter. The selected grid element spacing was 4.7 mm., corresponding to 48 arc seconds, and the diameter of the blur image was 0.8 mm., measured at the film plane. Photographs were taken at a series of wavelength intervals, using exposures between 20 seconds and 5 minutes.

With red illumination, the grid pattern appeared rectangular, thereby indicating exact focus and excellent performance at this wavelength. In the green, the focus was shifted, as indicated by parallelogram distortion, and spherical aberration was apparent. With blue illumination the central zone of the lens was seen to be parfocal with red illumination, with pronounced spherical aberration.

The observed grid distortions represent the axial chromatism of the lens under test combined with that of the collimator lens. Since the relative contributions of these lenses to secondary spectrum are approximately in inverse proportion to their focal lengths, the advantage of a long focal length collimator lens is evident.

A further experiment shows more clearly the behavior of the method with spherical aberration. For this test, a spherical meniscus lens, having a spherical power of −0.25 diopter, and a bend of 6.25 diopters which generates third-order, spherical aberration in large and calculable amounts, was employed as a supplementary attachment to the 250-mm. telephoto lens, red illumination, $\lambda=6,300$ A., and $C=0.14$ diopter, the highly transformed images of the diametral elements of the grid appeared as cubic curves; the magnitude of this distortion was in agreement with calculation.

For testing a 500-mm. f/8 catadioptric lens (Maksutov, of Russian manufacture), the grid spacing of the selected screen 234 was 3.2 mm., and the equivalent cylinder lens power was $C=0.05$ diopter.

An enlargement of the 1.6-mm. diameter blur image, obtained with unfiltered tungsten illumination showed around the occulted center a substantially uniform sharp, and square grid pattern showing that this lens is essentially without axial chromatism. The grid element spacing amounts to 33 arc seconds. The longer lines of the grid image (those that are not interrupted by the central occlusion) are imaged sharply, and the shorter lines are not; this is in accordance with diffraction theory by which the resolution is inversely proportional to the aperture that defines the line interval. The longest chord of the grid which does not intersect the central occlusion measures 50 mm., and the shortest is 14 mm. The corresponding FIGS. appear to be consistent with the test results, which thus provides an indication of the sensitivity of the test method, and of the quality of the lens tested.

We have described methods for testing photographic lenses making use of a weak crossed-cylinder lens. In the method just described the star image of a collimator is photographed through the cylinder lens, together with an oriented rectangular grid. The resultant photograph is a shadow image of this grid. Spherical aberration and coma cause distortions of the elements of the image of the grid. The two effects are readily separable, causing odd and even function distortions of the diametral elements of the grid, respectively. In the foregoing test the lens is operated at full aperture; defects of figuring are also observable and can be quantitatively assessed. Small errors of focal adjustment do not compromise the test results, and can be independently measured, thereby enabling critical readjustment of the camera rangefinder mechanism. Repetition of these tests with passbands determined by a set of interference filters enables, additionally, the determination of axial chromatic aberration; also observable are chromatic variations of spherical aberration and coma.

The slit-lens test described first is better suited for the determination of field curvatures. In this test, a polar coordinate chart is photographed through a supplementary cylinder lens and slit attachment. Those portions of the lines and circles of the chart which survive high-contrast development and printing, form in their spacial arrangement a cruciform pattern. Distortions of the horizontal and vertical arms of this pattern determine the curvatures of the tangential and radial fields, respectively. The shapes of the arms of the cross characteristic of constant field curvatures are calculated. A second factor affecting the shape of the cruciform pattern is tilt of the film plane relative to the lens axis. This effect can be separated analytically from the effects of the field curvatures, and the information so obtained permits realignment of the lens axis.

There are four Siedel aberrations and two color aberrations which affect image sharpness. Of these, the cylinder lens tests leave undetermined only lateral chromatism.

It will be noted that the cylinder lens tests have certain similarities and differences. Both tests involve photographing a test image through a cross-cylinder lens or the optical equivalent, in each case, the objective of the camera (which may be of refracting or reflecting optics) is partially masked by a rectilinear obstacle oriented with respect to the principal axes of curvature of the cross-cylinder lens so that the obstacle has its major linear elements parallel to the bisector of the angle between the principal curvature axes, that is at 45° to each of them, or parallel to the lines of zero curvature. In both cases a modified image of a coordinate frame is formed on a film within the camera located between the astigmatic foci. In the one method this is of a polar coordinate frame, while in the other it is of a rectangular coordinate frame. In the one case the test image is a point source at a distance, while in the other it is the polar coordinate chart. In one case screen elements are the linear elements obstructing the objective, while in the other, the edges of the slit do.

In both cases, the properties of the camera are deduced from the resulting modification of the normally regular pattern of the respective frames of reference. In both cases, the images of these frames remain recognizable because of their selected orientation relative to the astigmatic axes.

It will be understood that the above-described embodiments of the invention are by way of illustration and that other equivalents and variations will be apparent to persons skilled in the art without departing from the spirit of the invention as defined by the following claims.

I claim:

1. For testing a camera having an objective by imaging a test image upon a film, apparatus in combination comprising:
   a. means for positioning said image with respect to said objective so that a picture of said image may be made on said film;
   b. an astigmator, having a power no more than 2½ percent of the power of said objective;
   c. means for positioning said astigmator between said objective and said image so that in concert with said objective astigmatic foci are located one in front of, and one behind said film; and
   d. a rectilinear obstacle, positioned closely in front of said objective to block a portion of the light entering said objective from said image, with a principal linear element of said obstacle aligned parallel to the bisector of the principal axes of correction of said astigmator.

2. Apparatus as defined by claim 1:
   e. wherein said test image is a polar-coordinate chart having lines of equal thickness;
   f. wherein said astigmator is a crossed-cylinder lens; and
   g. said obstacle has a straight diametric slit therethrough.

3. Apparatus as defined by claim 2:
   h. wherein said chart has equally spaced concentric circles and evenly spaced radial lines of equal thickness.

4. Apparatus as defined by claim 2 (h) wherein said obstacle is an opaque coating of said lens divided by said slit.

5. Apparatus as defined by claim 1:
   e. wherein said test image is a polar-coordinate chart; and
   f. said astigmator is a segment of a crossed-cylinder lens.

6. Apparatus as defined by claim 1:
   g. wherein said object is a simulated star; and
   h. wherein said obstacle is a rectangular screen.

7. Apparatus as defined by claim 6:
   i. wherein said star is simulated by a virtual source which is the image of a selected illuminated aperture, reduced by a microscope lens.

8. Apparatus as defined by claim 7:
   j. wherein said astigmator comprises:
      1. a positive collimating lens;
      2. a negative cylinder lens between said collimating lens and said source; and
      3. means for adjusting the spacing between said source and said cylinder lens and between said cylinder lens and said collimating lens.

9. The method of testing a camera range-finder and objective lens comprising the steps of:
   a. placing a target comprising a pattern of contrasting radial lines of uniform thickness centered in the field of said camera normal to its optical axis at a distance determined by said range-finder;
   b. interposing closely in front of said lens and coaxially, and analyzer comprising a lens element bounded by surfaces defined by a plane and a twisting sheet, and a slit limiting transmission to a section including the line of uniform thickness through said element;
   c. forming by photographic exposure through said analyzer and lens an image of lines of said pattern on a photosensitive medium in said camera;
   d. developing said image to high contrast; and
   e. noting the lines of said pattern which are reproduced in said steps.